United States Patent
Woodward et al.

(10) Patent No.: US 10,540,175 B2
(45) Date of Patent: Jan. 21, 2020

(54) UP-LEVEL APPLICATIONS TO A NEW OS

(71) Applicant: AppZero Software Corp., Ottawa (CA)

(72) Inventors: Mark Woodward, Stittsville (CA); Chuanbao (Robert) Wang, Kanata (CA); Mohammed Ahmed-Muhsin, Ottawa (CA)

(73) Assignee: AppZero Software Corp., Ottawa (CA)

( * ) Notice: Subject to any disclaimer, the term of this patent is extended or adjusted under 35 U.S.C. 154(b) by 0 days.

(21) Appl. No.: 15/912,445

(22) Filed: Mar. 5, 2018

(65) Prior Publication Data
US 2019/0272172 A1    Sep. 5, 2019

(51) Int. Cl.
*G06F 9/455* (2018.01)
*G06F 8/76* (2018.01)

(52) U.S. Cl.
CPC .............. *G06F 8/76* (2013.01); *G06F 9/455* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 8,935,506 B1* | 1/2015 | Gopalan | ............. | G06F 12/1009 711/202 |
| 9,569,246 B2* | 2/2017 | Roehrig | .............. | G06F 9/45508 |
| 9,626,507 B2* | 4/2017 | Krasin | .................. | G06F 9/5005 |
| 9,971,622 B2* | 5/2018 | Bjorkengren | ....... | G06F 9/45558 |
| 2007/0250540 A1* | 10/2007 | Hsu | ........................ | G06F 16/188 |
| 2009/0157882 A1* | 6/2009 | Kashyap | ................. | H04L 69/16 709/227 |
| 2010/0082816 A1* | 4/2010 | Kharat | .................. | G06F 9/4856 709/226 |
| 2012/0227058 A1* | 9/2012 | Hunt | ................... | G06F 9/45558 719/318 |
| 2012/0246634 A1* | 9/2012 | Wright | ................ | G06F 9/44521 717/174 |
| 2013/0254884 A1* | 9/2013 | Dalcher | .............. | G06F 11/3466 726/22 |

(Continued)

OTHER PUBLICATIONS

Sosinsky, B., Cloud Computing Bible, pp. xxv-xxviii and 93-111, Wiley Publishing, Inc., Indianapolis, IN, 2011.

*Primary Examiner* — Matthew J Brophy
(74) *Attorney, Agent, or Firm* — Burris Law, PLLC

(57) ABSTRACT

A system, method, and computer program product is provided for migrating an application from a source computing environment having a source Operating System (OS) to a target computing environment, the target computing environment having a target OS. The method may include discovering applications and resources on the source computing environment; preparing a migration computing environment having the target OS based on the discovered applications and resources; instantiating a virtual migration sandbox in the migration computing environment; instantiating the application within the virtual migration sandbox; and, capturing in-process and out-of-process calls made by the application during execution; updating the migration computing environment based on the captured in-process and out-of-process calls.

10 Claims, 12 Drawing Sheets

(56) References Cited

U.S. PATENT DOCUMENTS

| | | | |
|---|---|---|---|
| 2014/0137125 A1* | 5/2014 | Hsu | G06F 9/4856 718/102 |
| 2015/0052521 A1* | 2/2015 | Raghu | H04L 63/0272 718/1 |
| 2015/0278513 A1* | 10/2015 | Krasin | G06F 9/5005 726/30 |
| 2015/0301848 A1* | 10/2015 | Roehrig | G06F 9/45508 718/1 |
| 2015/0324219 A1* | 11/2015 | Fitzgerald | G06F 8/60 718/1 |
| 2016/0055026 A1* | 2/2016 | Fitzgerald | G06F 21/51 718/1 |
| 2016/0285958 A1* | 9/2016 | Das | G06F 9/45558 |
| 2016/0378525 A1* | 12/2016 | Bjorkengren | G06F 9/45558 718/1 |
| 2018/0157524 A1* | 6/2018 | Saxena | H04L 63/0236 |
| 2018/0181451 A1* | 6/2018 | Saxena | G06F 9/45537 |

* cited by examiner

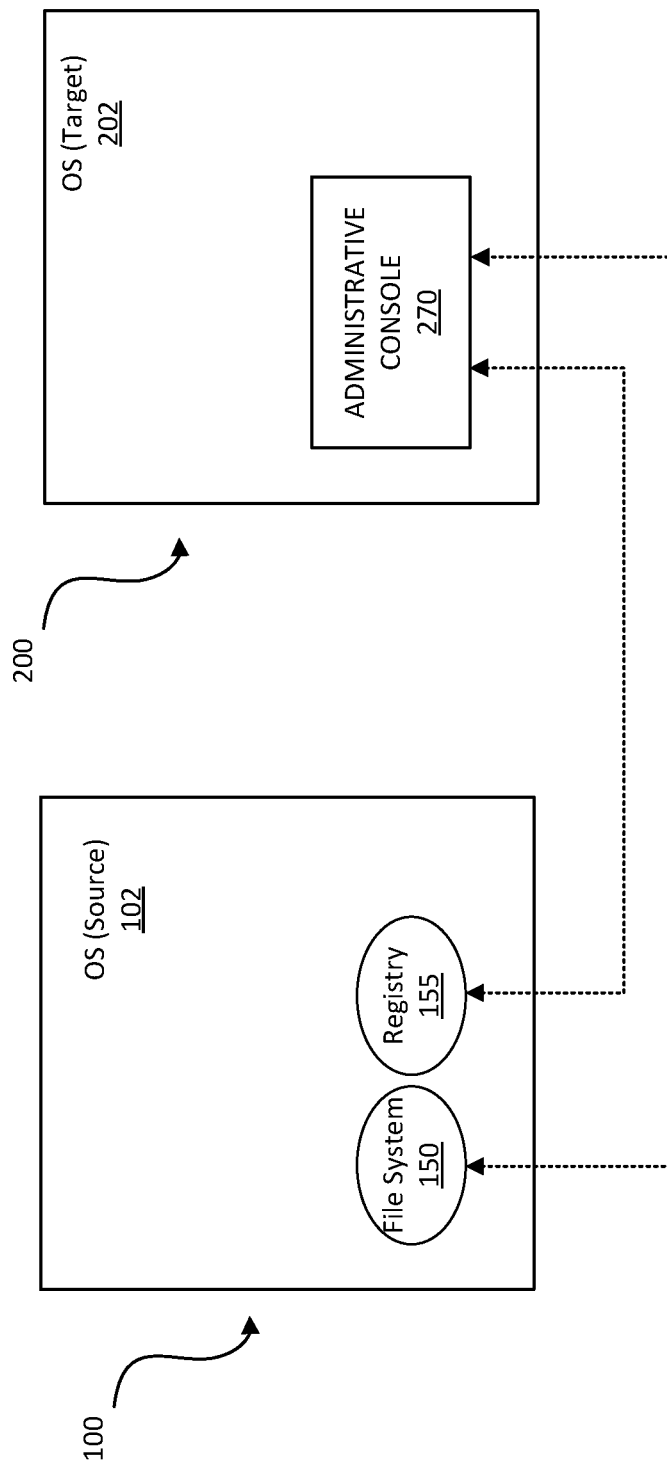

UP-LEVEL APPLICATIONS TO A NEW OS

FIELD

The present disclosure relates to computer software and, more specifically, to tools and methods for migrating applications from a source computing environment to a different target computing environment.

BACKGROUND

The statements in this section merely provide background information related to the present disclosure and may not constitute prior art.

When an application is installed in a computing environment a number of resource files, including configuration files, library files, etc., are created by the installation process at various locations in the computing environment to support the application. The installation process also makes changes to the computing environment, such as by creating or modifying registry keys, in order to support operation of the application.

A problem that arises is how to manage the transition from a current (i.e. legacy) source computing environment to a new updated target computing environment. One way to transition from a legacy environment to a target computing environment is to re-install the applications that were executing in the source computing environment directly in the target computing environment. Data files may typically be maintained in a data store accessible to either computing environment, or migrated over by copying the data files from the source computing environment to the target computing environment.

In some cases, such as in virtualized environments, a machine image of the source computing environment may be maintained as an image. An issue with this approach is that the source computing environment is preserved as-is, and is not maintained current with newly issued functional and security updates. This can lead to bugs, vulnerabilities, and interoperability issues with newer computing environments and applications since the image is of the "old" operating system and related computing environment.

There are a number of additional difficulties with these approaches, some of which are described in more detail below.

A first difficulty is that applications and operating systems are often patched over time. These patches can affect resource files, location and content, as well as the computing environment, registry key changes, etc. An application that is re-installed in a target computing environment will need to be re-patched in order to function properly. This process can be time consuming and in some cases difficult to replicate.

A second difficulty is that applications may be customized or modified for operation in the legacy environment. In some cases the application installer may be designed for the source computing environment. In these cases it may not be possible to re-install the application in the target computing environment without modifying or re-writing the installer and/or the application itself.

Modification of the original installer and source code may introduce new errors, would require re-testing of the product and consume significant resources. Accordingly, in some situations it is desirable to migrate applications without making changes to the original source code.

A third difficulty is that legacy applications may no longer be supported by application providers, and accordingly there may be no porting software or installer available for the legacy application to be installed or ported to the target computing environment. Application providers may only provide new versions of software for the target computing environment.

A fourth difficulty is that copying executables and resource files from one computing environment to another computing environment works inconsistently at best, and for some applications never works properly.

These difficulties often lead IT advisors to recommend staying with a source computing environment as long as possible, even though support and security for the source computing environment may be inferior to the target computing environment.

In some cases government regulatory bodies may certify specific applications, and specific application versions, for use. In these situations it can be very costly and time consuming to move from a legacy application to a newer version or replacement which is not currently certified for use.

Another issue that arises when trying to migrate applications is that in many cases the source computing environment is a mission critical asset of the system owner. In these situations the system owner may refuse to allow any experimentation or testing on the source computing environment that will affect the execution of the applications or the operating system. If this is the case then the application migration can only rely on passive observations of the source computing environment, and all testing or experimentation must take place in the target computing environment which remains offline until the migration is complete.

One particular issue that has arisen related to Microsoft Windows is the hardware transition from 32 bit to 64 bit processors. This switch has affected all legacy applications that were written for a 32 bit environment. Inherently a 64 bit OS will support the execution of a 32 bit application, however, the internal architecture of the OS differs subtly due to changes in the bit architectures. These differences are typically accounted for during initial installation of the application as the installer is operative to modify the application installation for the current operating system environment. Migrating from a 32 bit source computing environment to a 64 bit target computing environment presents additional challenges.

During original installation an application is configured by the installer to match the target computing environment: OS version, file locations, patches, drivers, etc. During the migration process the application components have to be reconfigured from the source computing environment to the target computing environment. For instance the application components may need to be reconfigured from a 32 bit source computing environment to a 64 bit target computing environment, or from an older 64 bit source computing environment to a newer 64 bit target computing environment.

In some cases the locations of files are different in the target computing environment from expected locations of files in the source computing environment. In these cases migration requires not only copying over files from the source computing environment, but relocating the copied files to the corresponding "new" location in the target computing environment.

Application migration arises both with conventional desktops and laptops, as well as for virtualized environments. In general, there is a need for an application migration tool and/or method that simplifies the process of migrating applications from one computing environment to another.

Accordingly, there is a need for methods and systems to assist in migrating applications from a source computing environment to a target computing environment, e.g. from one operating system (OS) version to another, along with all the data and configuration information available to the application in the source computing environment.

SUMMARY

The present disclosure provides a wireless transfer of power that alleviates the challenges described above, and to do so using the simplest possible constructional arrangement.

In an embodiment a method is provided for migrating an application from a source computing environment having a source Operating System (OS) to a target computing environment, the target computing environment having a target OS. The method comprising: discovering applications and resources on the source computing environment; preparing a migration computing environment having the target OS based on the discovered applications and resources; instantiating a virtual migration sandbox in the migration computing environment; instantiating the application within the virtual migration sandbox; and, capturing in-process and out-of-process calls made by the application during execution; updating the migration computing environment based on the captured in-process and out-of-process calls.

In an embodiment, a system is provided for executing a method for migrating an application from a source computing environment having a source Operating System (OS) to a target computing environment, the target computing environment having a target OS. The method comprising: discovering applications and resources on the source computing environment; preparing a migration computing environment having the target OS based on the discovered applications and resources; instantiating a virtual migration sandbox in the migration computing environment; instantiating the application within the virtual migration sandbox; and, capturing in-process and out-of-process calls made by the application during execution; updating the migration computing environment based on the captured in-process and out-of-process calls.

In an embodiment, a non-transitory computer readable medium is provided that, when executed by a processor of a computing device, executes a method for migrating an application from a source computing environment having a source Operating System (OS) to a target computing environment, the target computing environment having a target OS. The method comprising: discovering applications and resources on the source computing environment; preparing a migration computing environment having the target OS based on the discovered applications and resources; instantiating a virtual migration sandbox in the migration computing environment; instantiating the application within the virtual migration sandbox; and, capturing in-process and out-of-process calls made by the application during execution; updating the migration computing environment based on the captured in-process and out-of-process calls.

The above-described properties, features and advantages of the present disclosure, as well as the manner in which they are achieved, will become clearer and more easily understood in the following schematic description of one form, and they are explained below in greater detail with reference to the drawings. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIGS. 4A, 4B, 4C are schematic diagrams illustrating embodiments for connecting a source computing environment to a migration computing environment.

Figure 1:
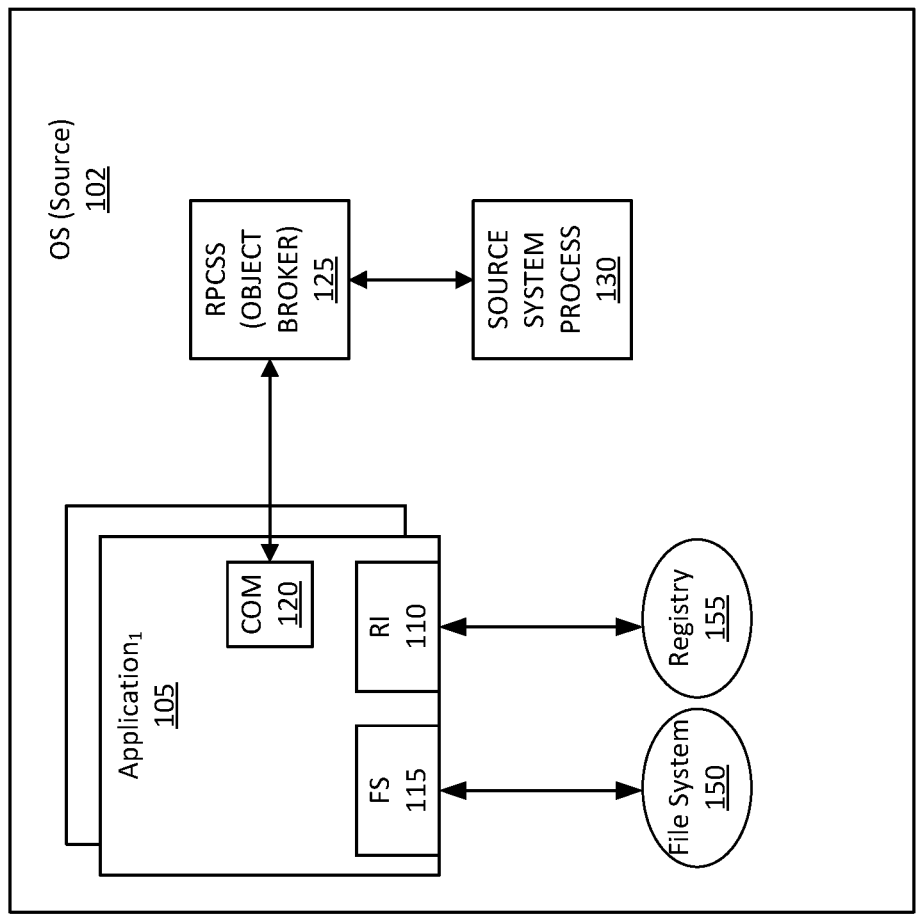
FIG. 1 is a schematic diagram of a prior art computing environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present application is directed to methods and systems for migrating applications from a source computing environment to a target computing environment. In embodiments, an intermediate migration computing environment, comprising the target operating system of the target computing environment modified to assist with migration, is used during migration. At the end of migration, the migration computing environment may be "dissolved" to deliver the migrated applications operating in the target computing environment.

The present application provides a specific example of application migration in the context of Microsoft Windows as the source and target operating system (OS). Some features are particularly useful in the context of a Windows computing environment, but in general the present application is applicable to other operating systems.

In some embodiments, the systems and methods disclosed herein enable an application native to a source operating system to, after migration, run under a different target operating system from the source operating system without making any changes to the source code of the application. In the context of the present application, "different" is used in the sense that the source and target operating systems may be different versions of a same operating system such as Windows.

In some embodiments, the systems and methods disclosed herein enable an application native to a source operating system to, after migration, run under a same target operating system as the source operating system without making any changes to the source code of the application. These embodiments allow for transfer of applications without re-installing, re-configuring, and/or validating the applications in the new target operating system, and may avoid the need to re-process any updates for the operating system.

In some embodiments, the migration may be managed by an administrative console executing on an administrative computing environment that includes a plurality of machine readable migration instructions stored in a machine readable medium (or media), and at least one hardware processor executing the instructions. In some embodiments, the migration instructions may be executed in a migration computing environment. In some embodiments, the migration instructions may be executed by another computing device(s) in an administrative computing environment. The administrative computing environment may connect to the source computing environment, the migration computing environment, and/or the target computing environment remotely, as necessary.

Each of the source computing environment and the target computing environment, and the administrative computing environment if relevant, may consist of operating systems executing on a physical computer, or may consist as virtual machines maintained by one or more hardware systems. Each of the source computing environment and the target computing environment are supported by one or more hardware processors, exemplified in and not limited to be compliant with the X86-64 ABI. In some embodiments, e.g. related to virtual machine(s) or cloud computing, at least one of the source and target computing environments may share a hardware processor with another computing environment, though each computing environment comprise a separate instance of an operating system. In some embodiments, the source computing environment and the target environment may share a same hardware processor, though the source computing environment and the target computing environment may comprise separate instances of different operating systems, or different versions of a same operating system. For example, the computing environments may comprise virtual desktop infrastructure (VDI) bubbles supported by a server. The source computing environment and the target computing environment may each comprise different instances of a same operating system (typically different versions of that operating system).

When running under the source computing environment, applications make use of a source component object model (COM) for managing object components that enable interaction between applications. The target operating environment may have its own COM, different from the source component object model, in the sense that the source and target component object models may be different versions of a same model. The method may be used, for instance, for migration between different versions of Microsoft Windows operating system, wherein the source and target COMs, and other software components, are different versions of the Microsoft Component Object Model (COM). Each of the source and target component object models may be implemented in the respective operating system as one or more executable files and libraries and require one or more registry keys to have predefined values specific for that model (i.e. specific for that computing environment). Applications may each include one or more executable files, and may make use of user files, library files, and/or configuration data.

Referring to FIG. 1, a simplified outline of a prior art conventional source computing environment 100 is illustrated. The source computing environment 100 including a source operating system (OS) 102 and at least one application 105 executing in the source OS 102. The OS 102 may support a source object broker 125 (such as RPCSS for MS Windows illustrated in FIG. 1), and a source system process 130 (such as SVCHOST for MS Windows illustrated in FIG. 1). The purpose of the source system process 130 being to host one or more services to support the application 105.

The application 105 includes a registry interface (RI) 110, a filesystem interface (FS) 115, and a component object interface (COM) 120. The RI 110 provides an interface between the application 105 and the source registry 155. The FS 115 provides an interface between the application 105 and the source file system 150. The component object model interface (COM) 120 provides an interface between the application 105 and the source object broker 125. The source object broker 125 brokers a collection of objects/classes constituting process resources available in the source OS 102. The collection of available component objects supported by the source OS 102 may generally be referred to as a component object model, such as that provided by the Microsoft Windows® operating systems. An application 105 may have one or many objects registered with the source object broker 125. The source file system 150 and the source registry 155 typically being part of the source OS 102. In some cases, the source file system 150 may support a remote file system (not shown) that may serve files to the source OS 102 as required.

During startup, an application 105 may need access to a number of resources provided by the source OS 102. For instance, the application 105 may need to access the source file system 150 to access library files, or to access the source registry 155 to obtain information about file locations, available services and the service locations, etc. In general, the application 105 may need to access and execute objects in order to support its operation. Some of these objects are in-process components, such as, for example, a .dll file, .ocx file, or other in-process component, which will run in the same process as the application 105. Some of the objects are out-of-process components which will run in their own threads of execution.

In-process components may typically be located by the application 105 directly accessing the source file system 150 and/or the source registry 155 to locate and obtain the required object resource. Once located and obtained, the application 105 is then operative to execute the required object resource.

Out-of-process components may typically be located by the application 105 accessing a source object broker 125 through the COM 120. The source object broker 125 facilitating access to the source system process 130 (e.g. SVCHOST) hosting the required service. Services supported by the source system process 130 may be implemented as dynamically-linked libraries (DLLs), and may be accessible to one or more applications 105. In some cases, a call to the source system process 130 will trigger execution of a new out-of-process component. In some cases, a call to source system process 130 will trigger connection to an already running out-of-process component.

As explained above, migrating an application 105 from a source computing environment 100 to a target computing environment is complicated as connections to resources available through the source system process file system 150, source system process registry 155, and source system process object broker 125 may differ in the target computing environment.

In an embodiment, a system and method is provided where a migration computing environment is established. The migration computing environment based on a target OS intended to operate in the target computing environment once migration has successfully been completed.

The migration computing environment being initially setup to support the application(s) to be migrated from the source computing environment based on observable changes that need to be made to accommodate the application(s) in the migration computing environment. The initial setup of the migration computing environment may include migrating observable resources that are required by the application(s) from the source computing environment to the migration computing environment. The observed resources are typically insufficient to enable the application(s) to successfully execute in the target OS due to the limitations of what can be passively observed in the source computing environment. Migration of observable resources is generally equivalent to the prior art method of copying over the application(s) and related resources from a source computing environment to a target computing environment. Though many prior art methods fail to capture all available observable resources in the copying process. Migrating observable resources during the initial setup is not a required step in the process, but may simplify and accelerate the migration process.

The migration computing environment also including additional functionality to support a monitoring step to capture and log calls for resources made by application(s) executing in the migration computing environment. In order to identify all of the required resources, such as the files that are required by the application(s) for successful execution in the target computing environment, each application is isolated within a "virtual container", referred herein as a virtual migration sandbox, in the migration computing environment as described further in more detail below.

In some embodiments, the migration computing environment further including the functionality to redirect calls for resources made by the application(s) to the source computing environment and to log such calls. In these embodiments calls made by application(s) executing in the migration computing environment are captured and redirected to the source computing environment to access the necessary resources.

Resources called upon by the application(s) in the migration computing environment may be copied or modified as required to allow for successful application execution in the migration computing environment. The execution of the application(s) in the migration computing environment, and subsequent capture and logging of application calls, may be iteratively repeated as necessary until all application calls are successfully served within the migration computing environment ("successful migration"). In some situations, it may be necessary to operate in the migration computing environment for an extended period, for instance to allow any application calls made during use of the application(s) to be captured.

After successful migration has been achieved in the migration computing environment, the application(s) are able to successfully execute in the migration computing environment with all called upon resources available in the migration computing environment. After successful migration, the migration computing environment may be dissolved. Dissolving the migration computing environment removes the additional migration functionality and corrects all file paths and registry entries to directly call upon the locally available resources, rather than directing calls through the migration computing environment functionality. After dissolution, a target computing environment is created in which the application(s) can successfully execute based on locally available resources.

Figure 2A:
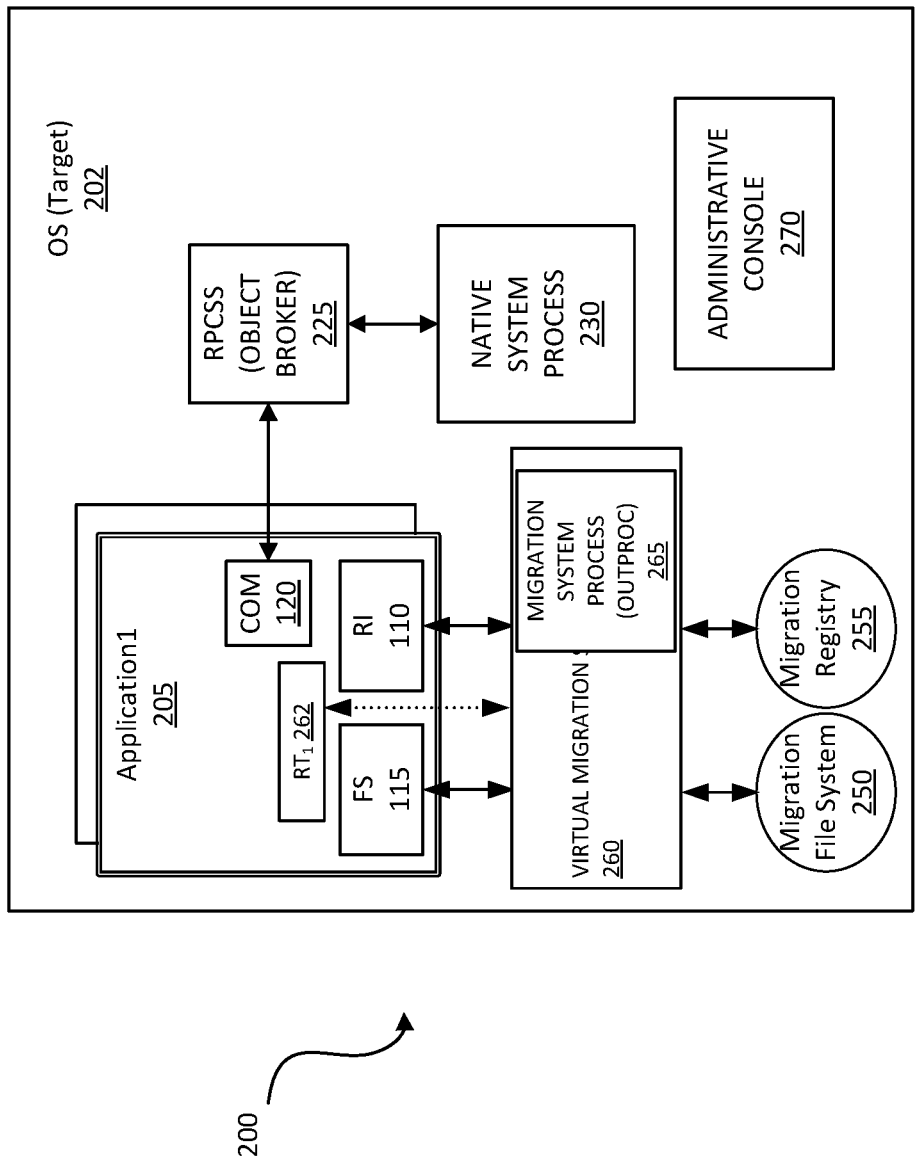
FIGS. 2A, 2B and 2C are schematic diagrams illustrating embodiments of a computing environment.

Referring to FIG. 2A, an embodiment of a migration computing environment 200 is presented. The migration computing environment 200 including a target OS 202 and at least one application 205 executing in the target OS 202. The migration object broker 225, migration file system 250 and migration registry 255 are all native to the target OS 202. Typically, though not necessarily, they may be different from the source object broker 125, source file system 150 and source registry 155 of the source computing environment 100 in operation and/or structure. In the embodiment of FIG. 2A, an administrative console 270 executing in the migration computing environment 200 is provided. In an embodiment, the administrative console 270 provides a collection point as a datastore for receiving migration information such as logged data and a user interface for communicating information relating to the migration and receiving commands for carrying out migration steps. In some embodiments, the migration information may be retained in a datastore located outside the administrative console 270, such as in a location on the migration file system 250.

A virtual migration sandbox 260 is a virtualized environment that encapsulates the application(s) 205 to isolate the encapsulated application(s) 205 from the target OS 202. The virtual migration sandbox 260 is instantiated in the target OS 202 before execution of the application(s) 205, and the application(s) 205 is executed within the virtual migration sandbox 260. In some embodiments, the virtual migration sandbox 260 is a separate functional entity from the administrative console 270. In some embodiments, the virtual migration sandbox 260 comprises an environment hosted by the administrative console 270. In some embodiments there may be a single virtual migration sandbox 260 for all applications 205. In some embodiments there is a separate virtual migration sandbox 260 for each application 205 to be executed.

In an exemplary embodiment, adopted for explanation purposes, the virtual migration sandbox 260 comprises a separate functional entity from the administrative console 270, which is instantiated to isolate a single corresponding application 205.

The virtual migration sandbox 260 acts to capture calls made by the application 205 for system resources, such as the migration file system 250 and the migration registry 255, during application execution. The captured calls may be logged with the administrative console 270 and/or re-directed as necessary to a correct location in the migration computing environment 200, or to a correct location in another computing environment such as the source computing environment 100. For instance, in the case of a directory mismatch between the source computing environment 100 and the migration computing environment 200, the virtual migration sandbox 260 may be operative to add path information to connect the application(s) 205 to requested resources available in the migration computing environment 200. In some implementations the virtual migration sandbox 260 may be operative to add path information to connect the application(s) 205 to requested resources available in the source computing environment 100. This functionality will be described in more detail below.

In some embodiments, the administrative console 270 may refer to a template for creating the virtual migration sandbox 260. In some embodiments, the template comprises an XML template. In some embodiments, the template may be copied into the migration computing environment 200 during an initial preparation step and all virtual migration sandboxes 260 subsequently instantiated in the migration computing environment may be instantiated based on that template.

In some embodiments the virtual migration sandbox 260 employs a separate application runtime ($RT_i$) 262 to be injected within each application 205 when executed. The application runtime 262 operative to log observable in-process (INPROC) calls made by the application 205 and to re-direct specific calls as necessary to support the virtual migration sandbox 260. In general, the application runtime 262 is operative to capture any in-process calls that may be made by the application 205, and re-direct the in-process calls to the virtual migration sandbox 260. In some embodiments, the application runtime 262 is further operative to report the captured calls to the administrative console 270 for logging. In other embodiments, the application runtime 262 is further operative to log the captured calls directly in the datastore.

In the embodiment of FIG. 2A, the virtual migration sandbox 260 further includes a replacement migration system process 265 operative as a surrogate to serve the application(s) 205 in place of a native system process 230. The purpose of the migration system process 265 is to enable the virtual migration sandbox 260 to capture out-of-process calls made by the application(s) 205 to out-of-process components which are not visible to the administrative console 270 or the application runtime 262, which only captures in-process calls made by the application 205. In an embodiment, the migration registry 255 is also modified during the migration setup step to re-direct out-of-process calls from the native system process 230 to the migration system process 265. For instance, the migration registry 255 may be modified to re-direct out-of-process calls to the migration system process 265 instead of the native system process 230. Similarly, the registry 255 may be modified to cause the application 205 to re-direct all other application calls to pass through the virtual migration sandbox 260, rather than directly to the file system 250 or registry 255.

In-process call are observable by the application runtime 262, and accordingly in some embodiments may be allowed to pass through the COM 220 to the object broker 225 as is normally the case. In these embodiments, the application runtime 262 may further be operative to log the in-process calls and to report the in-process calls to the administrative console 270. Alternatively, in some embodiments, the in-process calls may also be passed through the virtual migration sandbox 260 and then directed to either the system process 230 or the migration system process 265. In these embodiments, the in-process calls may conveniently be logged and reported to the administrative console 270 by the virtual migration sandbox 260 rather than the application runtime 262.

Figure 2B:
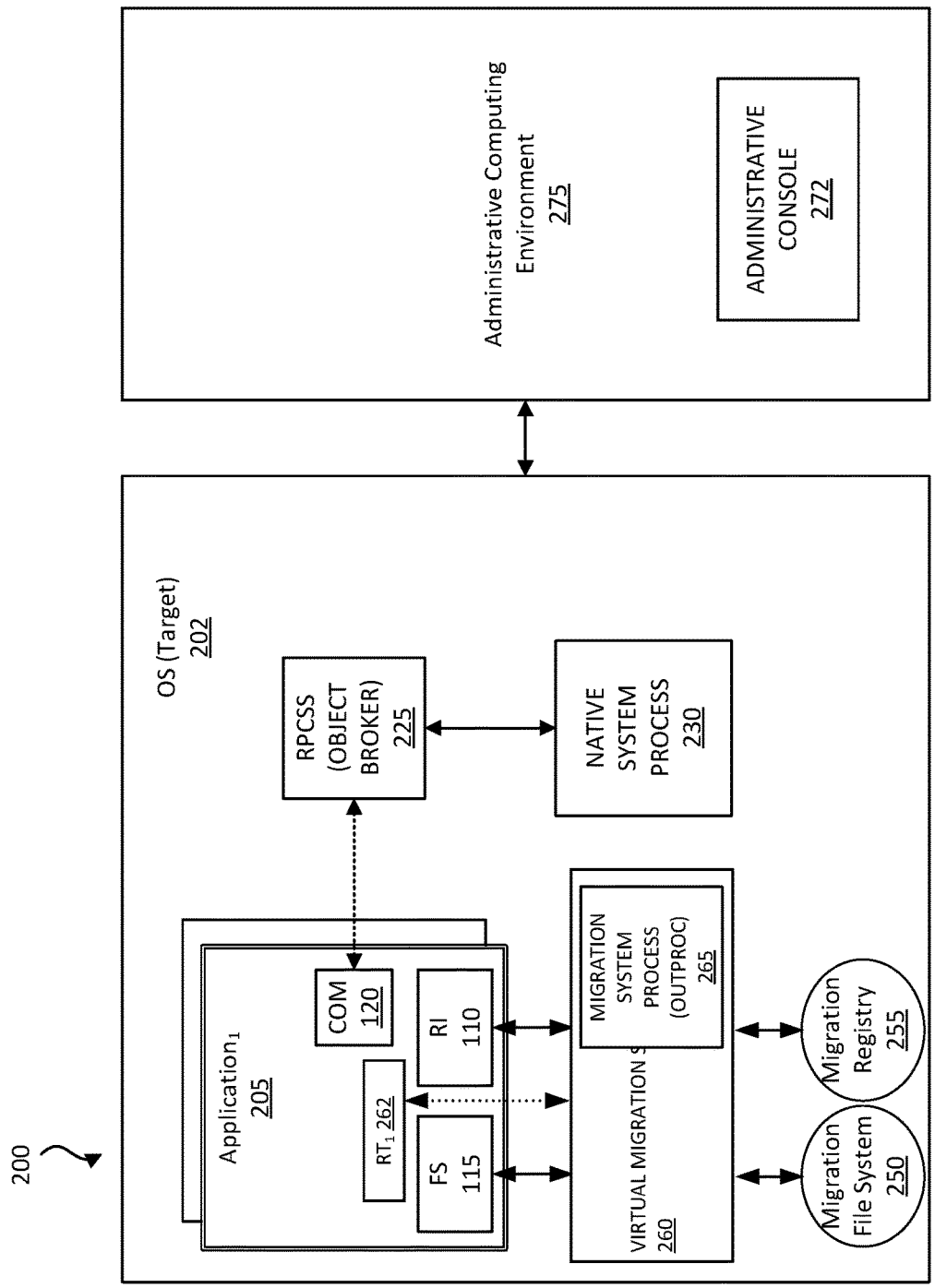

In the alternate embodiment of FIG. 2B an administrative console 272 hosted by an administrative computing environment 275 is in communication with the migration computing environment 200. In this alternate embodiment, the administrative console 272 is hosted external to the migration computing environment 200, but otherwise is functionally equivalent. The administrative computing environment 275 may, for instance, comprise a server or VDI bubble operative on a same local area network as the migration computing environment 200. In an embodiment, the migration computing environment 200 and/or the administrative computing environment 275 may comprise a virtualized computing environment. In some embodiments, the administrative computing environment 275 may communicate to the migration computing environment 200 over a network connection. In some embodiments, the administrative computing environment 275 may communicate to the migration computing environment 200 over a wide area network connection.

Figure 2C:
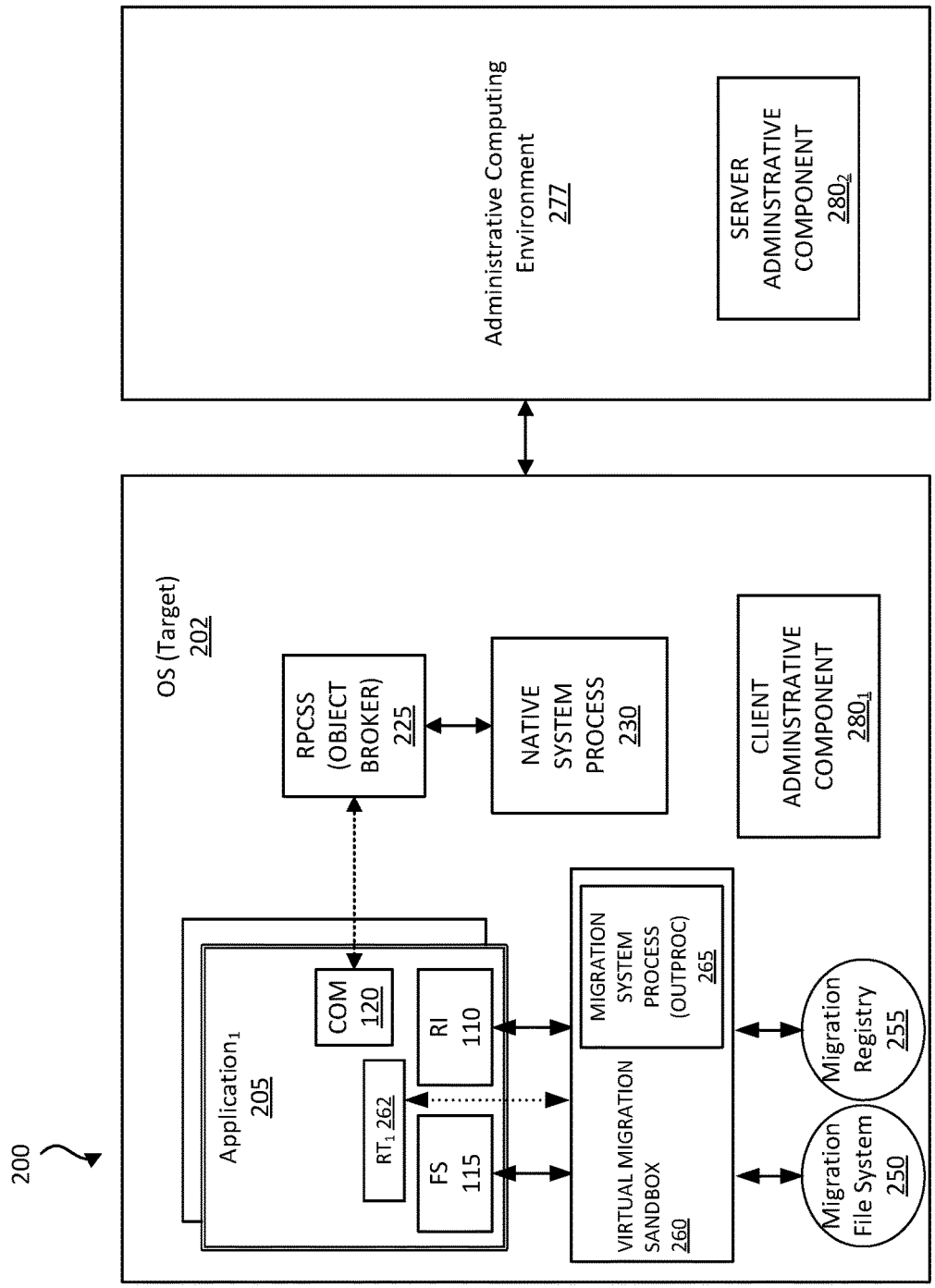

In a further alternate embodiment of FIG. 2C, a distributed administrative console 280$_1$ 280$_2$ is provided. In this embodiment, a client administrative component 280$_1$ is hosted in the migration computing environment 200 and a server administrative component 280$_2$ is hosted in the administrative computing environment 277. In some embodiments, the server administrative component 280$_2$ may be operative to support a plurality of client administrative components 280$_1$ in a corresponding plurality of migration computing environments 200. In an embodiment, the migration computing environment 200 and/or the administrative computing environment 277 may comprise a virtualized computing environment. In some embodiments, the administrative computing environment 277 may communicate to the migration computing environment 200 over a network connection. In some embodiments, the administrative computing environment 277 may communicate to the migration computing environment 200 over a wide area network connection.

In the embodiments of FIGS. 2B and 2C, as an alternative to the migration computing environment 200, the datastore that retains the migration information may be located on the administrative computing environment 275 either in place of, or in addition to, a datastore located in the migration computing environment 200.

The migration computing environment 200 is an interim state similar to a test environment. Any application(s) 105 in the source computing environment 100, along with readily observable support files within their file structure, are copied over to the migration computing environment 200 along with additional modifications that assist with completing the migration of the application(s) 105. The additional modifications include known corrections to account for differences between the source OS 102 and the target OS 202, as well as any known modifications required for the application(s) 105 to operate in the target OS 202. These known modifications may be inferred from an understanding of the differences between the source OS 102 and the target OS 202, or from prior experience with migrating such application(s).

Figure 3A:
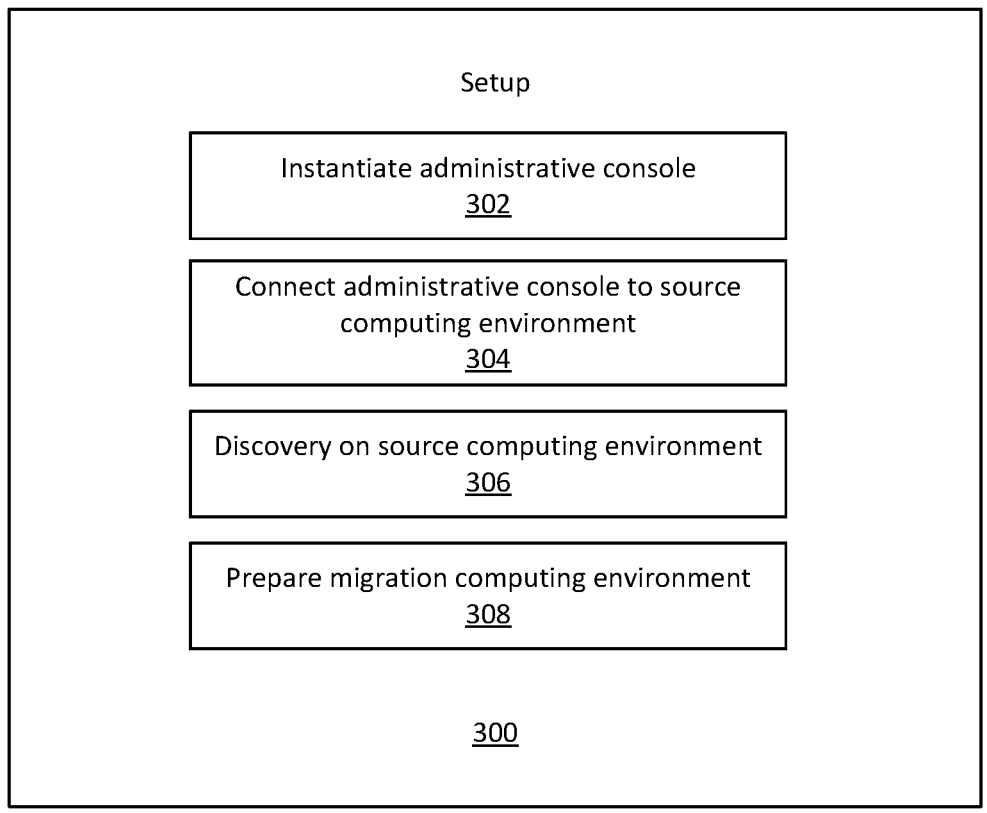
FIG. 3A is a process diagram illustrating embodiments of a setup method.

Referring to FIG. 3A, in an embodiment the migration process starts with a setup stage 300 that is performed before startup of the application 205 in the migration computing environment 200 The setup stage 300 may include some or all of the following steps, and while presented in an order the steps are not necessarily performed in a specific serial order, unless logically a preceding step is a precondition to a subsequent step. In general the setup stage 300 includes three main components: 1) locating ("discovering") applications and associated resources on the source computing environment; 2) copying ("migrating") the discovered applications and associated resources to the migration computing environment; and, 3) transcribing OS-specific changes to the migration computing environment 200 to account for universal OS differences (i.e. applicable to all applications that call upon a particular service or resource in the OS) between the source OS 102 and the target OS 202.

The setup stage 300 may be operated in two main implementations, with a number of minor variations depending upon particular needs. In administrative console instantiation step 302 the administrative console 270, 272 may be instantiated if not already instantiated. In the embodiment of FIG. 2A, for instance, the administrative console 270 may be instantiated in the migration computing environment 200. In the embodiment of FIG. 2B, for instance, the administrative console 272 may be instantiated an external administrative computing environment 275 in communication with the source computing environment and the migration computing environment 200. The external administrative computing environment 275 may comprise, for instance, a server in networked communication with the migration computing environment 200, and in a virtual computing context may have instantiated the migration computing environment 200 at the outset.

In connection step 304 the administrative console 270, 272 and the migration computing environment 200 are connected to the source computing environment 100.

Figure 4B:
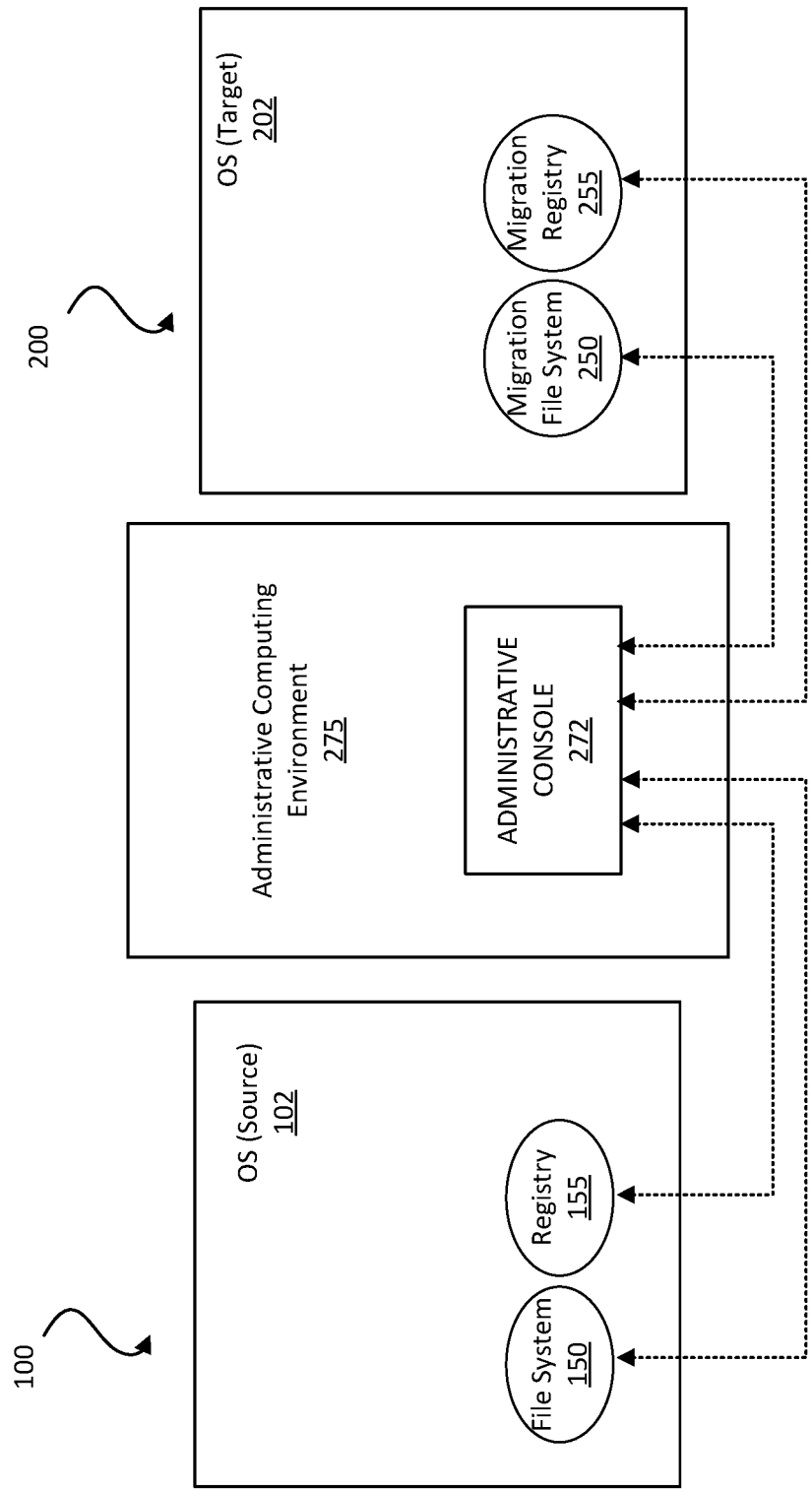
Figure 4C:
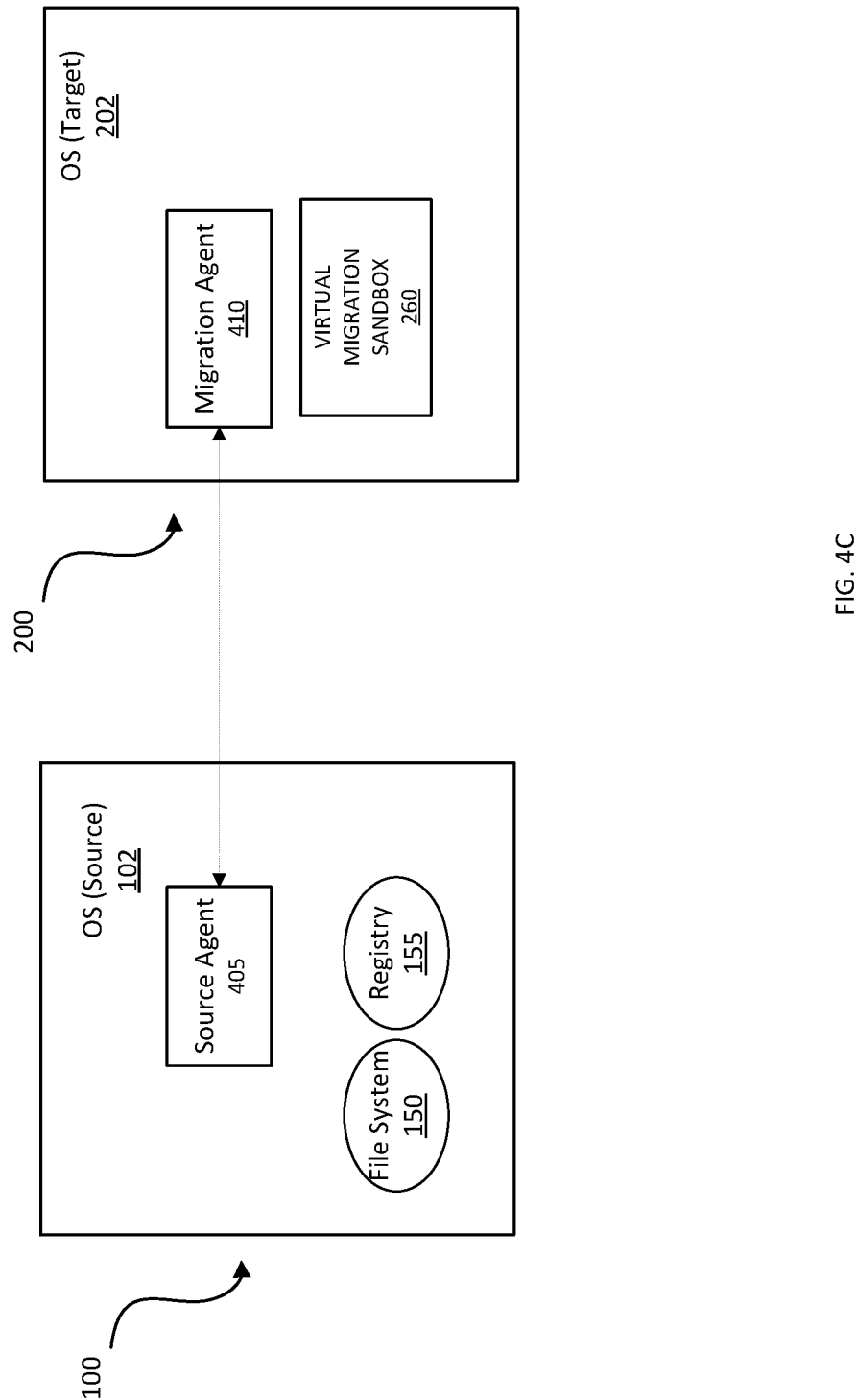

Referring to FIGS. 4A, 4B, and 4C, three examples for connecting the administrative console 270, 272, migration computing environment 200, and source computing environment 100 are illustrated. Other methods for connecting the components will be evident to the person of skill in the art.

Referring to FIG. 4A, in a first example, the administrative console 270, or in some implementations the virtual migration sandbox 260, may perform remote queries of the source file share 150 and the source registry 155.

Referring to FIG. 4B, in a second example, the administrative console 272 in the administrative computing environment 300 may service remote queries of the source file share 150 and the source registry 155 on behalf of the virtual migration sandbox 260.

In some embodiments a source agent may be provided in the source computing environment 100. The source agent operative to receive queries from the administrative console 270, 272, and/or an administrative agent in the administrative computing environment 275, and to service the received queries by accessing the source file system 150 and/or the source registry 155, and providing responsive information obtained from the source file system 150 and/or the source registry 155 to the administrative console 270, 272, and/or the administrative agent as the case may be.

Referring to FIG. 4C, in a second example, the virtual migration sandbox 260 may rely upon a source agent 405 within the source computing environment 100 and a migration agent 410 within the migration computing environment to provide connectivity between the source file system 150, source registry 155, and the migration computing environment 200. The source agent 405 and the migration agent 410 may, for instance, establish a compressed encrypted data pipe between the source computing environment 100 and the migration computing environment 200. The migration agent 410 acting as an interface to receive source file system 150 calls and source registry 155 calls redirected by the virtual migration sandbox 260 to serve a call by the application(s) 205 that is not supportable by the migration computing environment 200 in its current migration state. The migration agent 410 operative to direct the received calls to the source agent 405 operative in the source computing environment 100. The source agent 405 operative to receive the calls from the migration agent 410, and to access the source file system 150 and source registry 155 to obtain the resources corresponding to the received calls. The source agent 405 further operative to return the obtained resources responsive to the calls received from the migration agent 410. The migration agent 410 receiving the obtained resources from the source agent 405 and providing the obtained resources to the virtual migration sandbox 260, administrative console 270, or administrative console 272, as applicable, responsive to the redirected source file system 150 and source registry 155 calls received from the virtual migration sandbox 260, administrative console 270, or administrative console 272, as applicable. In some embodiments, the identity and location of the resources may be stored as migration information in a datastore available to the administrative console 270, 272.

Referring to FIG. 3A, in discovery step 306 the administrative console 270, 272 conducts discovery of the applications 105 and resources on the source computing environment 100. During the discovery step 306 the administrative console 270, 272 observes and queries the source computing environment 100 to obtain static information identifying the applications and related files to be migrated over to the migration computing environment 200. The identity and location of the applications 105 and resources on the source computing environment 100 captured during discovery step 306 may be recorded in a datastore available to the administrative console 270, 272.

In some embodiments the discovery step is a "passive" step in that information is read from the source computing environment 100 using native interfaces, but the application(s) 105 is not executed, and no additional applications, agents as described above, or executables are installed and/or executed on the source computing environment 100. For example, the migration tool may access the add/remove program utility available in the source computing environment 100 to identify which applications are installed in the source computing environment 100. Configuration data from the component object model may be queried based on the identified installed applications. Based on the name of each application, an application file folder and associated files located on the file system 150 may be identified for migration. The name of each application, or a portion of the name of each application, may be used to identify resources (files, registry keys, etc.) which are related to the application(s) 105. Furthermore, the logical relationship between files stored on the file system 150, or registry entries in the registry 155, may be used to identify other resources related to the application(s) 105. User identities and credentials may also be identified during discovery in order to ensure any user-specific information is migrated to the migration computing environment 200.

Based on this the discovery process may be a combination of automated and manual steps as files and components are identified as relating to each application. For instance, the discovery process may include the manual identification and selection of components that may be relevant to an application 105, but that do not share the same name/location as the application 105 to be migrated. Such components may be common among installed applications 105, or may be particular to a specific application 105 but has been previously identified during migration processes. Including manual identification and selection of components in the discovery process may accelerate the migration process as such components need not be discovered through automated discovery. The automated discovery process includes identifying components that share a name or term as the application 105, and/or share a related location on the file system 150. For instance, all components in the same file directory structure as the application executable may be automatically selected for migration during the discovery process based on their location identity. Similarly, components identified through the registry 155 as being associated with the application 105 may be automatically selected for migration through the discovery process based on a common registry identity with the application 105.

In some embodiments a discovery application or agent may be executed in the source computing environment 100 to assist with "active" discovery of applications and associated resources to migrate from the source computing environment to the migration computing environment 200. The use of active discovery is implementation-specific, depending upon whether modification of the source computing environment 100 is available. The discovery application/agent may be operative to inspect the source computing environment 100, and in some embodiments to further capture calls made by the application 105 in the source computing environment 100 to identify associated components. An embodiment of an active discovery application/agent is described below. The active discovery application/agent being further operative to record the migration information obtained during active discovery in a datastore available to the administrative console 270, 272. The location of the datastore may be any of the source computing environment 100, migration computing environment 200, and/or the administrative computing environment 275 depending upon the implementation.

Figure 3B:
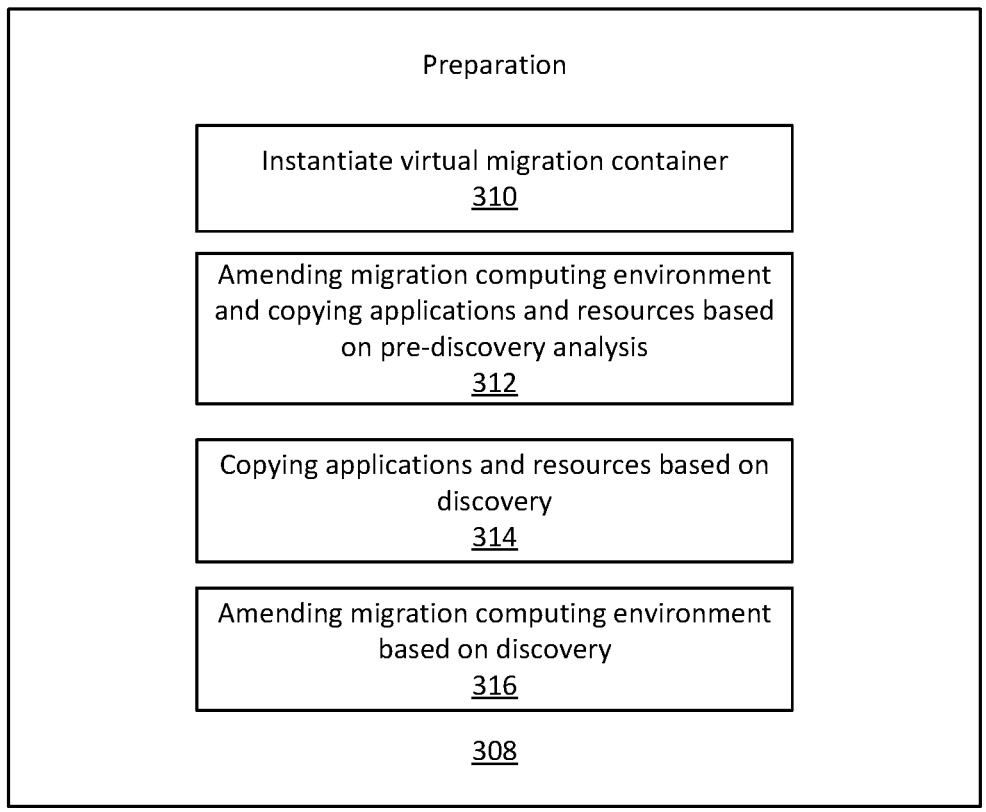
FIG. 3B is a process diagram illustrating embodiments of a preparation method.

Referring to FIG. 3B, in preparation step 308 the administrative console 270, 272 prepares the migration computing environment 200 for the migration process based at least on migration information obtained from the discovery step 304. The preparation step 308 generally includes: virtual migration sandbox instantiation step 310, instantiating the virtual migration sandbox 200 on the migration computing environment 200; pre-discovery migration computing environment preparation step 312, amending the migration computing environment 200 and copying application(s) 105 and associated resources based on pre-discovery analysis and 'universal' differences between the source OS 102 and the target OS 202; discovery-based copying step 314, copying application(s) 205 and associated resources based on the discovery step 306 from the source computing environment 100 to the migration computing environment 200; and, discovery-based amendment step 316, amending the migration computing environment 200, including amending the migration registry 255, based on the discovery step 306.

The pre-discovery migration computing environment amending step 312 generally includes making additional OS-specific migration corrections to the migration file system 250 and/or migration registry 255 to redirect application calls for source resources to migration resources available in the migration computing environment 200. In some embodiments, additional migration resources may be made available, such as where it is known that a source resource is not available as a native resource in the migration computing environment 200.

The discovery-based copying step 314 includes copying the discovered application(s) 105 and associated resources located in the source file system 150 to a corresponding location in the migration file system 250.

The discovery-based amendment step 316 generally includes: transcribing discovered registry settings and resources located in the source registry 155 that are relevant to the application(s) 105 into the migration registry 255 with any amendments necessitated by the target OS 202; making the necessary registry and file system changes so that application calls to resources are re-directed to the correct location in the migration computing environment 200; amending the migration file system 250 and the migration registry 255 to support the virtual migration sandbox 260, and in particular to re-direct migration file system calls and migration registry calls through the virtual migration sandbox 260 and to direct in-process calls to the surrogate system process 265.

The preparation step 308 further includes making the necessary registry and file system changes so that resource calls made by the application(s) 205 are re-directed through the virtual migration sandbox 260 and the migration system process 265 in place of the native system process 230.

In some implementations preparation step 308 may further include preparing the migration computing environment 200 based on other information such as known OS-specific 'universal' differences between the source computing environment 100 and the migration computing environment 200, and any known changes for specific applications that may have been migrated on other occasions.

An example of a universal difference between a source OS 102 and a target OS 202 would be the basic file system structure of a 32 bit source OS compared to a 64 bit target OS. In many cases resource location is different in the 64 bit OS from the 32 bit OS. Many of these universal differences can be pre-identified based on an understanding of the differences between the source OS 102 and the target OS 202, without relying upon discovery of the source computing environment 100.

A 32 bit application installed in the 64 bit OS would have the 64 bit OS resource locations identified by the installer. A 32 bit application installed in the 32 bit OS would have the 32 bit OS resource locations identified by the installer. In order to migrate successfully, calls to 32 bit locations may need to be re-directed to the known 64 bit locations if the path or resource is different. This can be accomplished, for instance, by adding amended path locations in the migration registry 255 to re-direct 32 bit source calls to the correct 64 bit target locations so that calls made by an application 205 will successfully locate the required resource in the migration computing environment 200. Alternatively, resources may be copied or moved to a consistent location in the migration computing environment 200 so that the application 205 is able to access the resource without redirection in the migration computing environment 200.

Another example of a universal difference between a source OS 102 and a target OS 202 would be where the target OS 202 includes one or more target resources that are not compatible with applications installed on the source OS 102 (i.e. the target resources available in the target OS replace source resources available on the source computing environment 100). In this case it may be necessary to add alternate migration resources to the migration computing environment 200, and to amend the migration registry 255 to re-direct calls from the source resources to the migration resources, rather than the native target resources available in the target OS 202.

The preparation step 308 also includes instantiation of the virtual migration sandbox 260 within the target OS 202 of the migration computing environment 200. The virtual migration sandbox 260 may be created by the administrative console 270, 272.

In some implementations, the virtual migration sandbox 260 is instantiated before conducting discovery step 306. Conveniently, the instantiated virtual migration sandbox 260 may be used to store all of the discovery information generated during the discovery step 308. The discovery information to be referenced during the remainder of the preparation step 308 to locate files and resources to be copied into the migration file system 250.

In some implementations, the virtual migration sandbox 260 may be instantiated after conducting discovery step 306. In these implementations the discovery information may be retained, for instance, In some embodiments portions of the discovery step 306 and the preparation step 308 may occur in parallel, or in alternation. For example, the preparation step 308 may include copying discovered information and resources from the source computing environment 100 to the migration computing environment 200 and transcribing any file system or registry changes necessary for the migration process into the migration file system 250 and the migration registry 255. Accordingly, the preparation step 308 may occur after conclusion of the discovery step 306, or may occur piecewise as information is discovered on the source computing environment 100.

Figure 5:
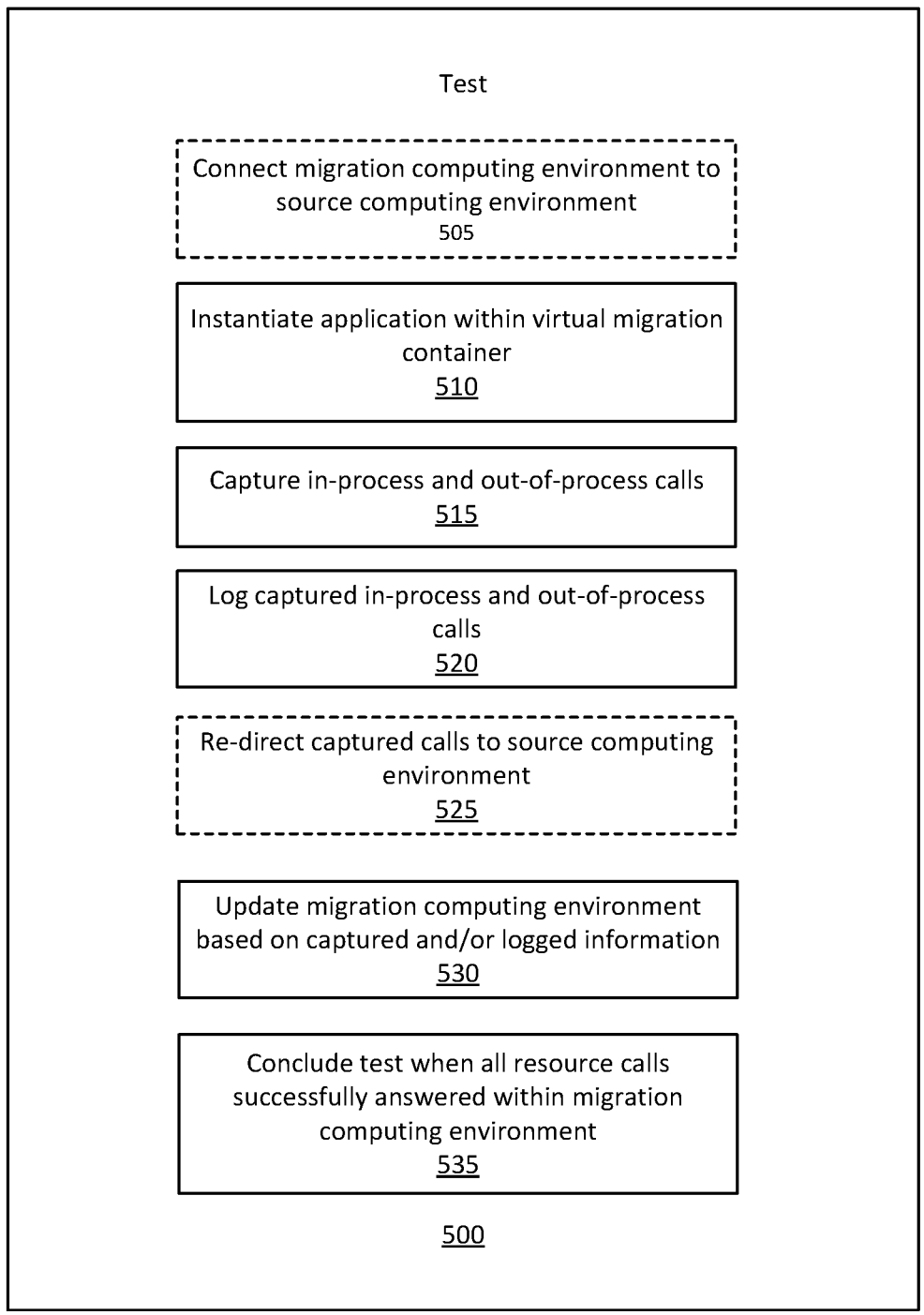
FIG. 5 is a process diagram illustrating embodiments of a test method.

Referring to FIG. 5, after completion of the setup step 300, the migration computing environment 200 may be evaluated during one or more iterative test steps 500. In optional step 505 the migration computing environment 200 is connected to the source computing environment 100, as described above. In alternate embodiments, the test steps 500 may proceed with the migration computing environment 200 disconnected from the source computing environment 100. In embodiments where the test steps 500 are executed with the migration computing environment 200 connected to the source computing environment 100, additional discovery of the source computing environment 100 may occur during the test steps 500.

Referring again to FIG. 5, in optional step 505 the migration computing environment 200 is connected to the source computing environment 100. For instance, the connection may be through the administrative console 270, 272 or through a migration agent 410 and source agent 405 as indicated above. In step 510 an application 205 is instantiated within the virtual migration sandbox 260. In step 515, the virtual migration sandbox 260 is operative, to capture in-process calls through the migration application runtime 262 and to capture out-of-process calls through the migration system process through the migration system process 265. In step 520 the captured application calls are logged to record that a call was made by the application 205, to identify whether a requested resource is available on the migration computing environment 200, and to identify any failed calls where the application called for a resource that was not available on the migration computing environment 200.

If the migration computing environment 200 is connected to the source computing environment 100, in step 525 the virtual migration sandbox 260 may be further operative to re-direct calls that are not supportable by the migration computing environment 200 in its current migration state to the connected source computing environment 100. Depending upon the connection method, such as the examples listed in FIGS. 4A, 4B, and 4C, the virtual migration sandbox 260 may either directly query the source file system 150 and source registry 155, send the query to a migration agent for 410 to satisfy the query, or, send the query to the administrative console 270, 272 to satisfy the query by obtaining the requested resource from the source computing environment 100.

In an embodiment the requested resources may remain on the source computing environment 100 and may be executed on the migration computing environment 200 over the connection. In an embodiment the files may be copied from the source computing environment 100 to the migration computing environment 200 for execution on the migration computing environment 200.

If the migration computing environment 200 is not connected to the source computing environment 100, then the test steps 500 may proceed directly to step 530 and update the migration computing environment 200 based on the logged information. The application 205 may then be instantiated once again in the sandbox 260, and the test steps 500 repeated until successful execution of the application 205.

Accordingly, by instantiating the application 205 while the migration computing environment 200 is connected to the source computing environment 100, missing resources may be discovered and accessed to allow further execution of the application 205 without the need to break out of the application execution. In some implementations an application 205 may successfully execute, albeit with resources accessed from the source computing environment 100. In these implementations considerably more information may be logged in a single test execution of the application 205 than would be the case if the migration computing environment was disconnected from the source computing environment 100.

In step 530, after the application 205 has either successfully executed or failed to completely execute, the migration computing environment 200 may be updated based on the logged information recorded in step 520. For instance, resources that were required but not available in the migration computing environment 200 may be copied from the source computing environment 100 to the migration computing environment 200. Path re-directions may be corrected in the migration file system 250 or migration registry 255 in cases where a resource is available in the migration computing environment 200, but the application 205 was not able to access the requested resource.

The test steps 500 may then be repeated until step 535 with successful execution of the application 205 with all resources available to the application 205 in the migration computing environment 200, and no re-direction to is required to access any of the resources.

After successful completion of the test steps 500, the application(s) 205 will all successfully execute in the migration computing environment 200. Depending upon requirements, the migration computing environment 200 may be maintained for a period of time to ensure all resources are available to applications 205 that may be called upon during application operation. In most cases, however, the next step is to dissolve the migration computing environment 200 by removing the virtual migration sandbox 260, migration system process 265, and registry re-directions, to arrive at the target computing environment.

Dissolving the migration computing environment 200 has a number of advantages over leaving the migration computing environment 200 in place. Dissolving the migration computing environment 200 may improve the usability of the computing environment. In some cases, application operation may be slightly different inside the virtual migration sandbox 260 than outside the virtual migration sandbox 260. For example, applications operating inside the virtual migration sandbox 260 may not be able to interoperate with any applications operating outside the virtual migration sandbox 260.

Dissolving the migration computing environment 200 may improve the ability to update the target OS 202 as compared with prior art OS static image methods of maintaining a legacy computing environment.

Dissolving the migration computing environment 200 may improve the ability to update the application(s) 205. Once the migration computing environment 200 has been dissolved the application(s) 205 looks like it is natively installed, and accordingly the application 205 may be updated in the target OS 202.

Dissolving the migration computing environment 200 may also assist future support as remote support services will be able to see the application(s) 205 executing in the target OS 202.

Dissolving the migration computing environment involves stripping off any runtime path extensions in the migration file system 250 and the migration registry 255 to restore the correct file location/file path location. Accordingly, resource calls made by the application(s) 205 will no longer be re-directed to the virtual migration sandbox 260 and/or the migration system process 265. For file paths that change between OS versions (such as between a 32 bit source OS 102 and a 64 bit target OS 202, the migration file system 250 and the migration registry 255 are amended to correct the pathing to the node that holds the correct application keys (in the example, the node that holds the 32 bit application keys).

Figure 6:
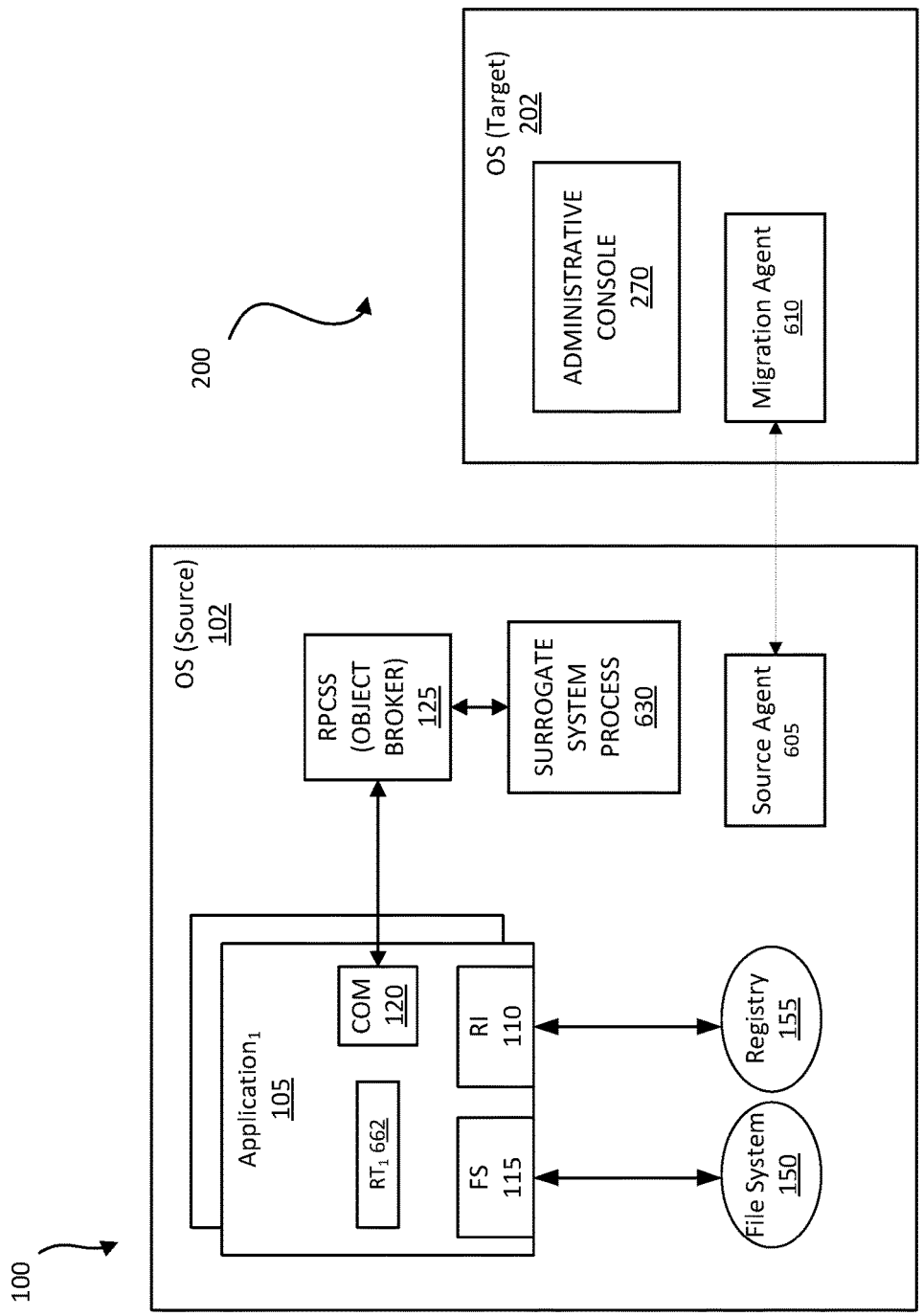
FIG. 6 is a schematic diagram illustrating embodiments for evaluating a source computing environment.

FIG. 6 illustrates an alternate embodiment where additional discovery may be performed in the source computing environment 100. As indicated above, in some implementations it is not possible to change to the source computing environment 100 due to stability or regulatory concerns. In these cases, only a passive observation of the source computing environment 100 is available. In other implementations, amendments to the source computing environment may be permissible, allowing for a more 'active' discovery of the source computing environment.

In FIG. 6, an embodiment is presented where the administrative console 270 is executing in the migration computing environment 200. A migration agent 610 in the migration computing environment and a source agent 605 in the source computing environment provide connectivity between the source computing environment 100 and the migration computing environment 200.

In the embodiment of FIG. 6, a source runtime 662 has been injected into the source application 105. A surrogate system process 630 has replaced the native system process (e.g. svchost). In operation, a working source application 105 may be executed in the source computing environment 100. The source runtime 552 and the surrogate system process 630 operative to capture all in-process and out-of-process resource calls made by the source application 105.

Since the source application 105 was installed in the source computing environment 100, it should successfully execute as all resource are available to the source application 105. During execution of the source application 105, the source runtime 662 and the surrogate system process 630 report captured in-process and out-of-process calls to the source agent 605. The source agent 605 transmits the captured in-process and out-of-process calls to the migration agent 610. The captured in-process and out-of-process calls may then be logged for retention in a datastore in the migration computing environment 200 for subsequent evaluation. In other embodiments, the captured in-process and out-of process calls may be retained and evaluated in another location, such as a datastore in the source computing environment 100 or the administrative computing environment 275.

The embodiment of FIG. 6 permits for a more advanced initial preparation of the migration computing environment to ensure all, or nearly all, resources are available in the migration computing environment before any test steps are conducted.

In some embodiments, instantiating the virtual migration sandbox 260 in the migration computing environment 200 is an optional step, if sufficient migration information is obtained from inspecting the source computing environment 100.

In some embodiments, the methods and systems described above may be embodied in a non-transitory computing program product that, when executed on a processor of a computing device, is operative carry out the described methods.

Figure 7:
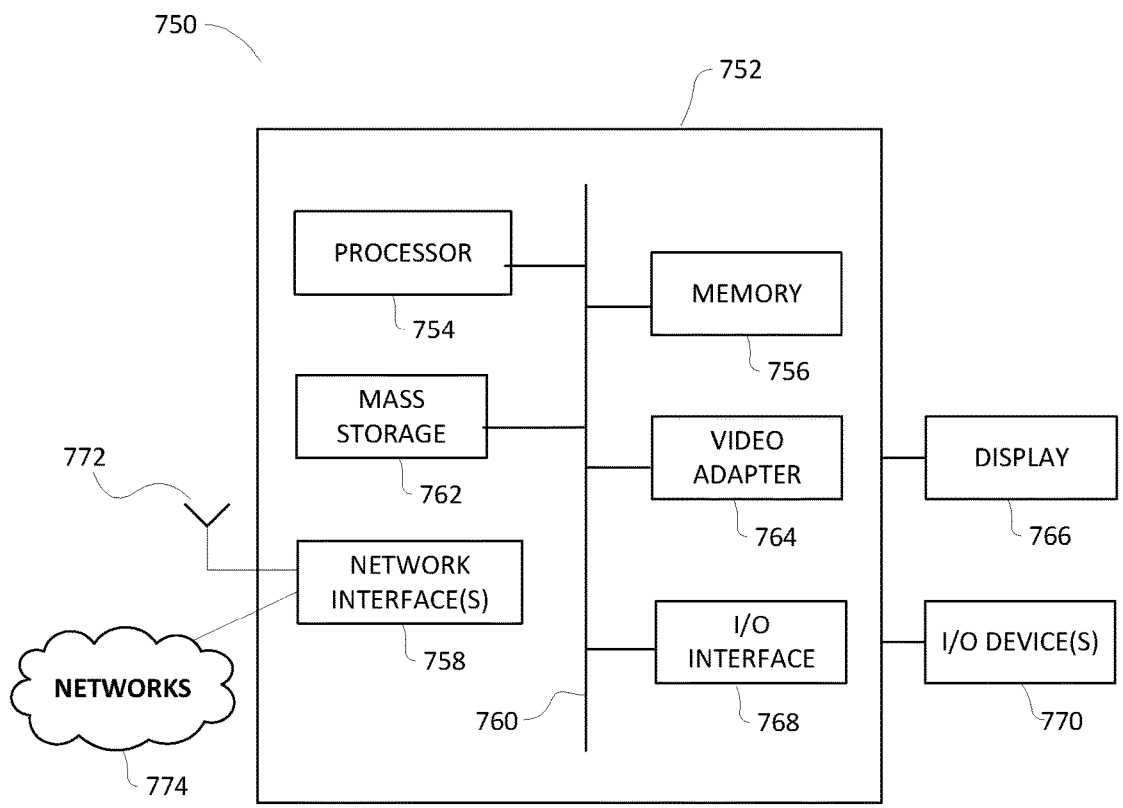
FIG. 7 is a block diagram of an electronic device that may be used for implementing devices and methods in accordance with representative embodiments of the present invention.

FIG. 7 is a block diagram of an electronic device (ED) 752 illustrated within a computing and communications environment 750 that may be used for implementing the devices and methods disclosed herein The electronic device 752 typically includes a processor 754, such as a Central Processing Unit (CPU), and may further include specialized processors such as a Graphics Processing Unit (GPU) or other such processor, a memory 756, a network interface 758 and a bus 760 to connect the components of ED 752. The ED 752 may optionally also include components such as a mass storage device 762, a video adapter 764, and an I/O interface 768.

The electronic device 752 may also include one or more network interfaces 758, which may include at least one of a wired network interface and a wireless network interface. As illustrated in FIG. 7, network interface 758 may include a wired network interface to connect to a network 774, and also may include a radio access network interface 772 for connecting to other devices over a radio link. The network interfaces 758 allow the electronic device 752 to communicate with remote entities such as those connected to network 774.

The mass storage 762 may comprise any type of non-transitory storage device configured to store data, programs, and other information and to make the data, programs, and other information accessible via the bus 760. The mass storage 762 may comprise, for example, one or more of a solid state drive, hard disk drive, a magnetic disk drive, or an optical disk drive. In some embodiments, mass storage 762 may be remote to the electronic device 752 and accessible through use of a network interface such as interface 758. In the illustrated embodiment, mass storage 62 is distinct from memory 56 where it is included, and may generally perform storage tasks compatible with higher latency, but may generally provide lesser or no volatility. In some embodiments, mass storage 762 may be integrated with a heterogeneous memory 756.

The optional video adapter 764 and the I/O interface 768 provide interfaces to couple the electronic device 752 to external input and output devices. Examples of input and output devices include a display 766 coupled to the video adapter 764 and an I/O device 770 such as a touch-screen coupled to the I/O interface 768. Other devices may be coupled to the electronic device 752, and additional or fewer interfaces may be utilized. For example, a serial interface such as Universal Serial Bus (USB) (not shown) may be used to provide an interface for an external device. Those skilled in the art will appreciate that in embodiments in which ED 752 is part of a data center, I/O interface 768 and Video Adapter 764 may be virtualized and provided through network interface 758.

Of course numerous other embodiments of the invention may be envisaged, without departing from the spirit and scope of the invention. In particular, non-mutually exclusive features of the embodiments disclosed herein may be combined to form additional embodiments of the invention.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for migrating an application from a source computing environment having a source Operating System (OS) to a target computing environment having a target OS, the source computing environment being separate from the target computing environment, the method comprising:
    discovering applications, resources, or both, on the source computing environment;
    preparing a migration computing environment having the target OS based on the discovered applications, resources or both;
    instantiating a virtual migration sandbox in the migration computing environment;
    connecting the migration computing environment to the source computing environment;
    instantiating the application within the virtual migration sandbox;
    capturing in-process and out-of-process calls made by the application during execution, the in-process calls running in a same process as the application, the out-of-process calls running in different execution threads than the application, wherein said capturing comprises monitoring the in-process and out-of-process calls;
    determining, based on said capturing of the in-process and out-of-process calls, if a particular resource required for successful execution of the application is unavailable in the migration computing environment;
    redirecting one or more of the in-process and out-of-process calls to a version of the particular resource located in the source computing environment to facilitate said successful execution of the application; and
    updating the migration computing environment based on the captured in-process and out-of-process calls to copy or modify resources in the migration computing environment as required to allow for successful execution of the application in the migration computing environment, said updating comprising copying the particular resource into the migration computing environment.

2. The method of claim 1, wherein the preparing the migration computing environment further comprises amending a migration registry to redirect resource calls through the virtual migration sandbox in the migration computing environment.

3. The method of claim 1, wherein copying the particular resource into the migration computing environment comprises copying said particular resource from the source computing environment to the migration computing environment.

4. The method of claim 1, wherein said preparing the migration computing environment comprises copying said discovered resources from the source computing environment to the migration computing environment.

5. The method of claim 1, wherein the migration computing environment is prepared by amending migration registry entries to redirect out-of-process calls made by the application to a migration system process in place of a native system process of the target OS.

6. The method of claim 1, wherein the instantiating the application within the virtual migration sandbox further comprises injecting an application runtime into the application, the application runtime operative to capture the in-process calls.

7. The method of claim 1, wherein after the application successfully executes in the migration computing environment based on resources available in the migration computing environment the method further comprises:
    dissolving the migration computing environment, by removing the virtual migration sandbox and restoring path locations of the migration registry to direct resource calls to resource locations, to produce the target computing environment.

8. A non-transitory computer-readable medium encoding instructions that, when executed by a processor of a computing device, execute the method of claim 1.

9. The method of claim 1, wherein the preparing the migration computing environment further comprises:
    copying discovered resources from the source computing environment to the migration computing environment; and,
    amending a migration registry to redirect resource calls through the virtual migration sandbox in the migration computing environment.

10. The method of claim 1, wherein the resources include one or more of: configuration files, library files, and registry keys.

* * * * *